Patented Mar. 10, 1931

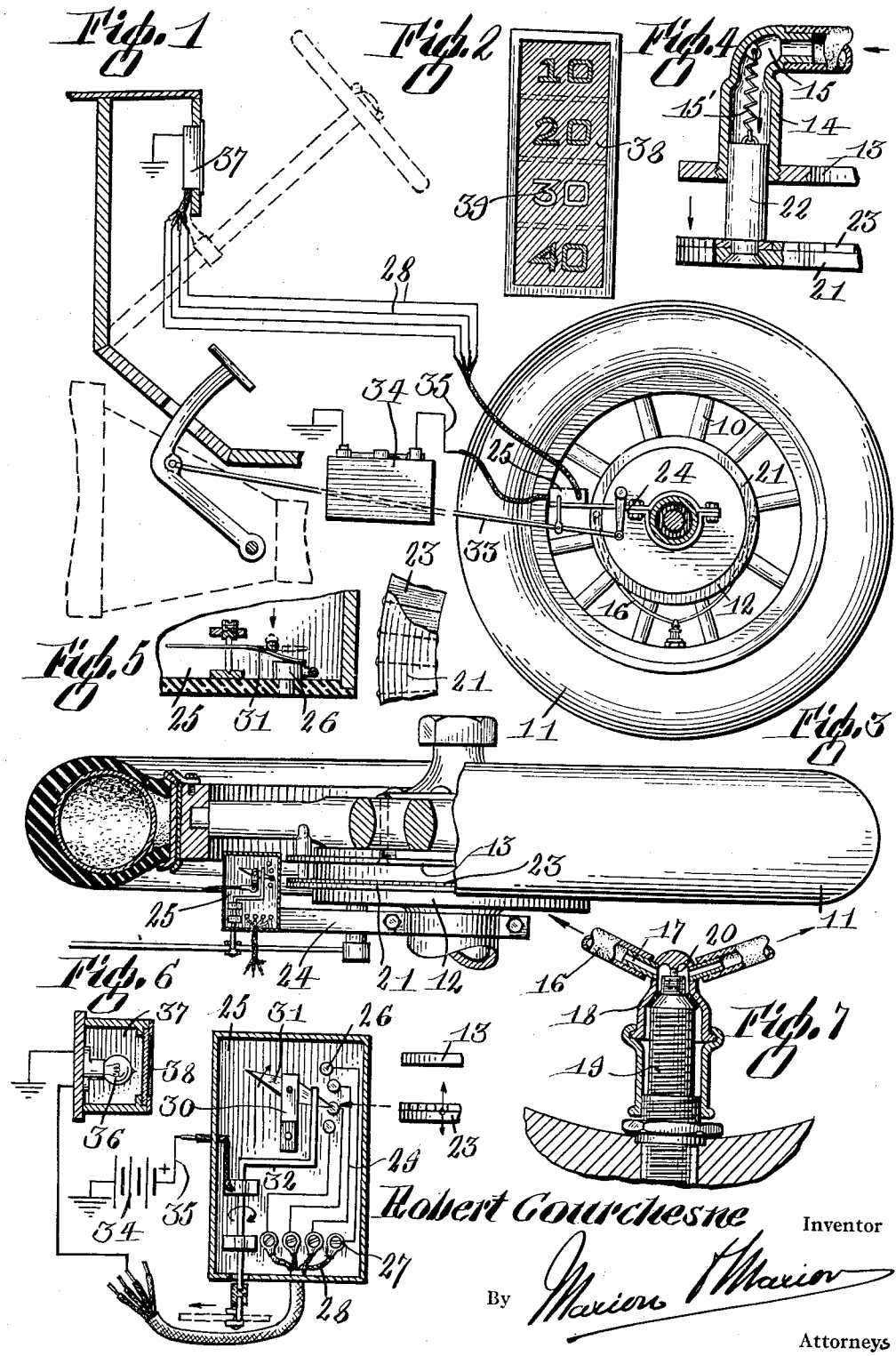

1,796,244

UNITED STATES PATENT OFFICE

ROBERT COURCHESNE, OF MONTREAL, QUEBEC, CANADA

AIR-PRESSURE INDICATOR

Application filed September 27, 1928. Serial No. 308,788.

The present invention relates to improvements in apparatus for indicating the air pressure in the carrier wheel tires of vehicles.

An important object of the invention is the provision of an apparatus which will enable the operator to determine the pressure of the air of pneumatic tires mounted on the carrier wheels of a vehicle at selective intervals.

A further object of the invention is the provision of an indicator of the above character which will be operated to display the air pressure of the tires upon operation of the vehicle brake mechanism.

Another object of the invention is the provision of an apparatus of the above character which can be mounted upon vehicles of standard construction.

Still another object of the invention is the provision of a tire air pressure indicator which will be relatively simple and efficient in operation and which can be installed upon vehicles at a comparatively low cost.

Other objects and advantages of the invention will become apparent as the description progresses.

In the accompanying drawing forming a part of this specification and in which like reference characters are employed to designate corresponding parts throughout the same:

Figure 1 is a fragmentary view showing parts of a motor vehicle with the improved apparatus mounted thereon, Figure 2 is a front view of an indicator, Figure 3 is a plan view of a vehicle wheel partly in section, Figure 4 is a sectional view through an air operating device, Figure 5 is a fragmentary sectional view of a switch mechanism, Figure 6 is a sectional view through an indicator and switch mechanism diagrammatically illustrating the electric circuit, and Figure 7 is a sectional view through an air distributing device.

Referring to the drawing, wherein for the purpose of illustration is shown a preferred embodiment of the invention, the numeral 10 generally designates a conventional carrier wheel commonly employed by motor vehicles upon which is mounted a pneumatic tire 11. Attached to the inner side of the wheel 10 is an annular drum member 12 normally comprising the brake drum of the vehicle.

Rigidly fixed on the drum 12, adjacent the spokes of the wheel 10, is an annular ring 13 formed with a pair of diametrically opposed apertures. These apertures are formed to threadedly engage outwardly projecting cylinder fittings 14 terminating at their outer ends in reduced angular extensions 15. To each fitting 14 is connected a flexible conducting tube 16 having its opposed end attached to a tubular projection 17 extending from a cap 18 mounted over the usual tire valve 19. The cap 18 is formed with a central pin 20 designed to compress a stem in the valve 19 so that the air from the tire 11 can flow freely through the tubes 16 to the cylinder members 14.

On the inner portion of the drum 12 is mounted a complementary ring 21 arranged annularly about the drum and mounted for transverse sliding movement thereon. The ring 21 carries a plurality of, in the present instance two, pistons 22 projecting outwardly and adapted to slidably engage the cylinders 14 attached to the fixed ring 13. To the inner side of the ring 21 are secured a plurality of radially projecting magnetized plates 23, the purpose of which will be later described.

Secured to the outer portions of the vehicle axle housing, and projecting longitudinally therefrom, is a bracket 24 forming a support for an elongated box-like casing 25. The casing is arranged to extend transversely on the bracket in longitudinal alignment with the ring 21. Mounted in the bottom of the casing at its inner portion are a plurality of, in the present instance four, fixed terminal contacts 26 arranged in longitudinally spaced positions. These contacts are disposed to register longitudinally with the area in which the ring 21 traverses in its transverse movement on the drum. At the inner portion of the casing 25 are mounted terminals 27 connecting with electrical conductors 28 extending through the outer side of the housing. The terminals 27 are electrically connected with the contacts 26 through the medium of wires 29. In the central portion of the housing 25 is mounted a bracket 30 in the outer end of which is mounted a vertical pivot forming a bearing for a magnetized needle 31. The energized point of the needle 31 is adapted to move in a horizontal arc over the contacts 26 and is selectively forced into engagement with the contacts by a crank member 32 journaled in the housing. The outer end of the crank is formed with a laterally offset extension arranged so that the end portion is normally disposed over the contacting needle point, while the inner end is formed with a downwardly bent arm which is attached to a brake operating rod 33 of the vehicle. The crank member 32 is electrically connected with a vehicle battery 34 through the medium of an electric conductor 35.

The conductors 28 are electrically connected with lamps 36 mounted in an indicator casing 37. The casing 37, which is of vertically elongated form, is provided with a series of transverse partitions dividing the same into a plurality of individual compartments, each of which carries a lamp 36. In the front of the casing is mounted a transparent, preferably glass plate 38 on which are inscribed numerals 39, each numeral registering with one of the compartments and designating the air pressure in the vehicle tires in pounds per square inch.

In use, when an individual tire 11 is fully inflated, the slidable ring 21 will be urged inwardly away from the fixed ring 13. This is effected by air which is conducted through the valve 19 and conduits 16 to the cylinder members 14 and which urges the pistons 22 outwardly of the cylinders against the tension of a spring 15′ tending to normally slide the pistons inwardly. As the pressure in the tire decreases, however, the ring 21 will slide outwardly toward the ring 13 and wheel hub. The position of the ring 21 will influence the needle 31 so that the magnetized point thereof will assume a position in longitudinal alignment with the magnet plates 23. The needle will, obviously, vary its position in accordance with the variation of the movable ring and will assume various positions with respect to the fixed contacts 26.

When the vehicle brake is applied all the way, and the vehicle stopped to prevent possible movement of the needle, the crank member 32 will be pivotally actuated to compress the operative needle point downwardly so that the point will engage the nearest contact 26. In this position, the electric circuit is closed between the battery 34 and the indicator so that one of the lamps 36 will be energized to illuminate a compartment of the signal casing displaying a designating numeral 39 indicating the approximate air pressure of the tire in correspondence with the position of the adjustable ring 21. It will be noted, that an independent circuit closing mechanism may be employed so as to eliminate the brake connection. Thus, the apparatus will indicate, at variable times, the approximate air pressure in the tires mounted on the carrier wheels so that the operator may constantly maintain the tires at a suitable pressure.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:—

1. An apparatus for indicating the air pressure in tires of vehicle wheels, comprising a magnetized annular member, means for movably mounting said member on a wheel, air pressure means for operatively shifting the magnetized member according to the air pressure variations in the tire, a magnetic switch member mounted adjacent the magnetized member independently secured from the wheel and influenced by the magnetized member so as to align over a plurality of contacts, indicators electrically connected to said contacts, an electric current source adapted to actuate the indicators when the switch member touches the contacts, and mechanism controlled by the brakes of the vehicle operable to depress the switch against any contact when said brakes are applied.

2. An apparatus for indicating the air pressure of vehicle tires, comprising a magnetized ring movably mounted on the brake drum of the wheel, air pressure means whereby said ring will be shifted to positions corresponding to the air pressure variations in the tire, a magnetic switch member adapted to shift in correspondence with the ring and mounted adjacent thereto on a fixed part of the vehicle, a plurality of contacts adapted to be engaged by the switch, an indicator having pressure designating numerals marked thereon and provided with lights electrically connected to the contacts, an electric current source in series with the contacts and the lights, and brake actuated mechanism for depressing the switch against the contacts for selectively illuminating an electric light of the indicator according to the position of the switch, when the vehicle brakes are applied.

3. An apparatus for indicating the air pressure of vehicle tires, comprising a ring slidably mounted on the brake drum of the wheel, means actuated by the air pressure in the tire to shift the ring to predetermined positions corresponding to the air pressure variations of the tire, a magnetized member attached to the said movable ring, a magnetic switch influenced by the magnetized member arranged adjacent the ring and supported upon the frame of the vehicle whereby it will shift in correspondence with the magnetized member above a plurality of switch contacts, an indicator having a series of air pressure indicating numerals and carrying lamps electrically connected with the contacts and in series with an electric current source to display each of the numerals, and brake controlled mechanism adapted to depress the switch against one of the contacts whereby the proper pressure designating numeral corresponding to the contact engaged by the switch will be displayed.

In witness whereof I have hereunto set my hand.

ROBERT COURCHESNE.